March 15, 1966     R. J. HEIL     3,240,222
CHECK VALVE FOR FUEL TANK TRUCKS AND SIMILAR VEHICLES
Filed July 22, 1963
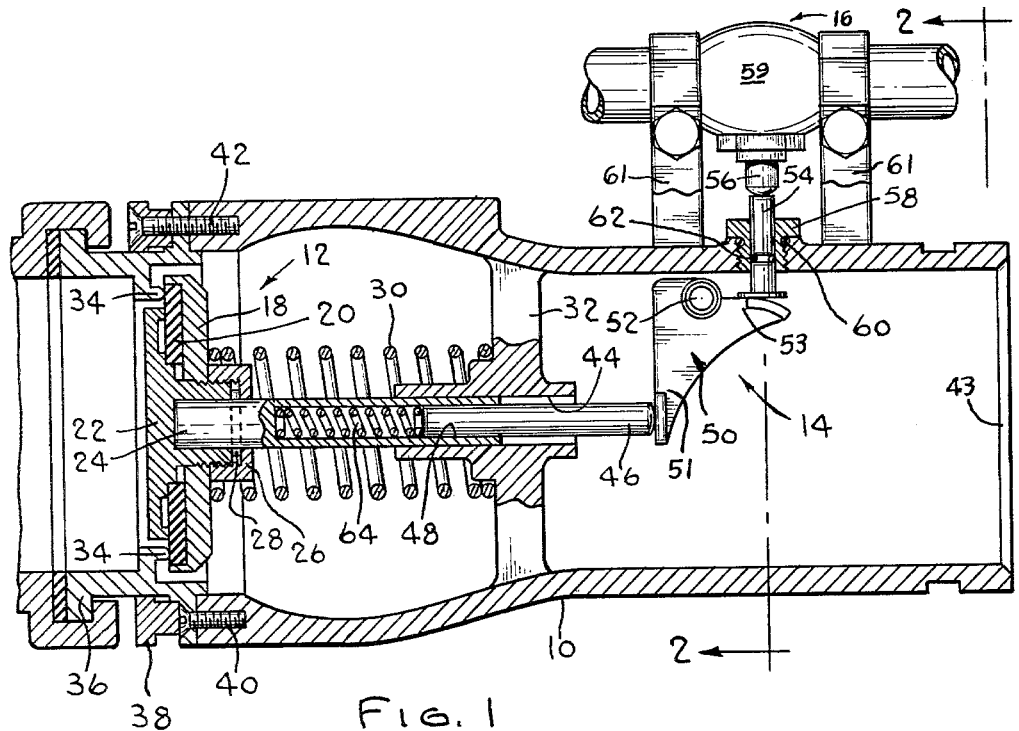
FIG. 1
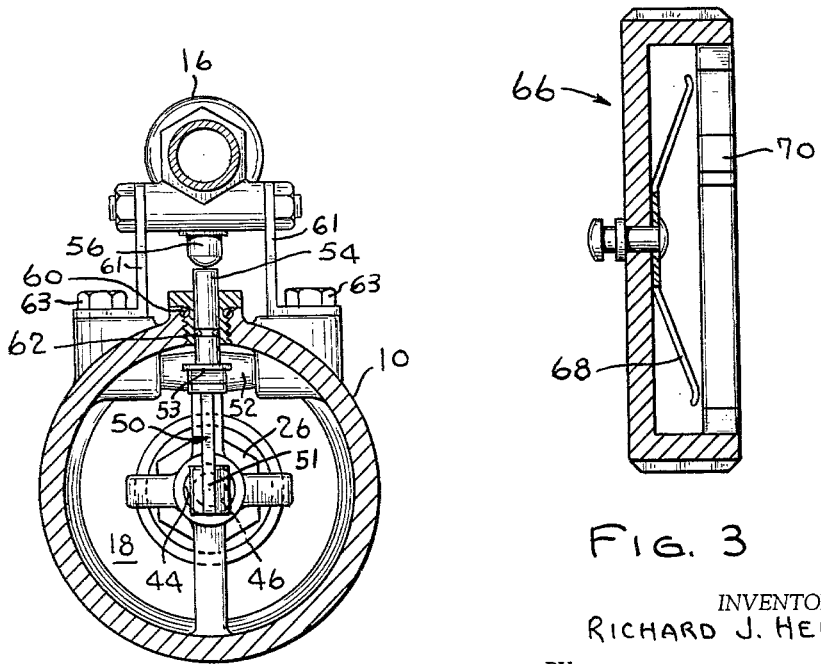
FIG. 2
FIG. 3
INVENTOR.
RICHARD J. HEIL
BY
Bayard H. Michael
ATTORNEY United States Patent Office 3,240,222
Patented Mar. 15, 1966

3,240,222
CHECK VALVE FOR FUEL TANK TRUCKS AND SIMILAR VEHICLES
Richard J. Heil, Hales Corners, Wis., assignor to Milwaukee Valve Company, Inc., Milwaukee, Wis., a corporation of Wisconsin
Filed July 22, 1963, Ser. No. 296,832
3 Claims. (Cl. 137—87)

This invention pertains to a check valve which is particularly adapted to be used as a loading and/or unloading valve for tank trucks and similar vehicles and which incorporates a mechanism for automatically opening the brake line of the vehicle during the loading process.

The principal object of this invention is to provide a check valve of the type described, which will be of a simple and relatively inexpensive construction and which will be adaptable for use with a wide variety of liquid carrying vehicles.

The simplicity of construction is attained by providing the brake actuating mechanism within the valve housing and by rendering the mechanism responsive to the opening and closing movement of the valve to thereby close or open the brake line of the vehicle. This feature permits a unitary and compact design and avoids the external mechanisms and linkages which have been employed heretofore to accomplish similar purposes. A further advantage of housing the brake actuating mechanism within the valve housing is that false brake actuation either by tampering with the mechanism, by accidental bumping, or by other external forces is virtually eliminated. Further, by making the valve housing and the brake actuating mechanism of a unitary construction, the check valve may be used for practically any liquid carrying vehicle.

Other objects and advantages will be pointed out in or be apparent from the specification and claims, as will obvious modifications of the single embodiment shown in the drawings, in which:

FIG. 1 is a cross sectional side view of the check valve embodying the present invention;

FIG. 2 is a cross sectional view taken on line 2—2 of FIG. 1; and

FIG. 3 is a cross sectional view of the cap used for the check valve.

The illustrated valve is a bottom loading check valve of the type used for fueling tank trucks through the bottom of the tank. This method of fueling avoids foaming of the gasoline and permits the loading of more actual liquid into the tank.

Referring to the drawings in detail, FIG. 1 shows a valve housing 10 which carries a valve 12 and a brake actuating mechanism 14, and which has an air brake line valve 16 externally mounted thereon.

The check valve is comprised of a disc holder 18 which has a resilient seat disc 20 secured to its outer face by a pinch washer 22, and which is mounted on valve stem 24 by means of disc nut 26 and pin 28. The check valve is biased in the closed position by compression spring 30 which seats on rib 32 and presses the seat disc 20 into sealing engagement with the valve seat 34 of the bayonet adaptor 36. The latter is secured to the housing by means of selector ring 38 and screws 40 and 42. As it should be appreciated from the above, the valve housing 10 is essentially a fluid conveying conduit which has its one open end 43 adapted to connect the conduit to a fluid carrying compartment of a vehicle.

The check valve is actuated to an open position by a fueling nozzle (not shown) which is coupled to the bayonet adaptor and acts against the face of the check valve to move the valve inwardly into the valve housing 10 and to thereby permit fuel passage into the tank of the truck. This opening motion causes a corresponding inward travel of the valve stem 24 in the bore 44 of the rib 32.

The opening movement of the check valve is transferred to the air brake line valve 16 by means of pin 46 which is retained in bore 48 of the valve stem, and which causes rocker link 50 to pivot on pin 52 and thereby cause pin 54 to depress plunger 56 of the air brake line valve 16 to open the same. The rocker link 50 is provided with a first lever section 51 which abuts against pin 46 and a second lever section 53 which abuts against pin 54. The abutting relationship permits pivotal motion of the link in respect to the pins during movement of the link. The opening of the latter valve, of course, sets the brakes of the vehicle to immobilize the same. Pin 56 is slidably mounted in bushing 58 and both the bushing and pin are sealed by O-rings 60 and 62, respectively. The brake line valve 16 has a housing 59 which is mounted by straps 61 and bolts 63 to the valve housing 10.

In order to allow for variances in manufacturing tolerances and to cushion the transfer of motion between the check and air brake line valves, a compression spring 64 is retained in bore 48 and provides a biased stop for pin 46.

After the loading or fueling is completed, the fueling nozzle is withdrawn, and the check valve automatically moves to the closed position, and the upwardly biased plunger 56 moves to open air brake line valve 16 and to pivot rocker link 50 to return to the position shown in FIG. 1.

From this description it should be appreciated that the connecting linkage, or brake actuating mechanism 14, comprised of pin 46, rocker link 50 and pin 54 is retained in the valve housing 10 and in general can be considered to be tamperproof and incapable of being accidentally actuated. The plunger 56 of the air brake line valve 16, although being outside of the valve housing, is substantially protected from inadvertent or accidental actuation because its free end is always covered by pin 54 and thereby cannot be engaged to actuate the plunger.

A cap 66 as shown in FIG. 3 may be provided to be engaged with the bayonet adaptor 36 and thus to protect the check valve during travel or storage of the tank truck. The cap is provided with a spring 68 and bayonet point 70 for this purpose.

While the illustrated embodiment of this invention is shown as a bottom loading check valve, it should be understood that the invention is equally applicable to other types of loading and/or unloading valves.

Although but one embodiment of the present invention has been illustrated and described, it will be apparent to those skilled in the art that various changes and modifications may be made therein without departing from the spirit of the invention or from the scope of the appended claims.

I claim:
1. Apparatus for coordinating the actuating of a valve for a fluid carrying compartment of a vehicle and the brakes of the vehicle, comprising:
   a generally tubular fluid conveying conduit having one open end adapted to place the conduit in communication with the fluid carrying compartment of the vehicle and having its other open end provided with valve seat means;
   a check valve mounted in said conduit and axially movable in respect thereto between a valve-open position at which fluid may flow through said other open end and a valve-closed position at which said valve sealingly engages said valve seat means;
   a brake line valve mounted on the exterior of said conduit and adapted to be connected to the brake circuit of the vehicle, said brake line valve having a valve housing separate from said conduit and re- movably mounted on the exterior thereof, said brake line valve also having valve actuating plunger projecting through a section of said housing facing said conduit and terminating outside of said conduit;

pin means extending through the wall of said conduit and mounted therein for slidable movement in a direction generally transverse in respect to the axis of said conduit, said pin means being connected at one of its ends to said valve actuating plunger to cause actuation of said brake line valve in response to the slidable movement; and a link pivotally mounted to the interior of said conduit and having one lever section connected to said check valve and another lever section connected to said pin means, said link being moved in response to movement of said check valve and thereby transforming the axial movement of said check valve into a transverse movement which causes said slidable movement of said pin means.

2. An apparatus according to claim 1 wherein said one lever section of said link extends generally transverse to the axis of said conduit and said other lever section extends generally axially in respect to said conduit.

3. An apparatus according to claim 2 wherein said check valve is connected to said first lever section by an axially extending pin which is axially movable in response to the movement of said check valve and which abuts against said lever section, and wherein the other end of said pin means abuts against said second lever section, the abutting relationship of said pin and pin means permitting pivotal motion of said pin and pin means in respect to said link as said link is moved.

References Cited by the Examiner

UNITED STATES PATENTS

| | | | |
|---|---|---|---|
| 364,708 | 6/1887 | Davison | 137—94 |
| 2,094,829 | 10/1937 | Spelts. | |
| 2,225,882 | 12/1940 | Neale | 137—94 X |
| 2,284,910 | 6/1942 | Long | 137—94 X |
| 2,945,502 | 7/1960 | Matthews | 137—595 X |

FOREIGN PATENTS

| | | |
|---|---|---|
| 406,104 | 11/1909 | France. |
| 128,891 | 7/1919 | Great Britain. |

M. CARY NELSON, *Primary Examiner.*

MARTIN P. SCHWADRON, *Examiner.*